US012713225B2

(12) United States Patent
Rydén

(10) Patent No.: US 12,713,225 B2
(45) Date of Patent: Aug. 18, 2026

(54) MANAGING A WIRELESS DEVICE THAT IS OPERABLE TO CONNECT TO A COMMUNICATION NETWORK

(71) Applicant: Telefonaktiebolaget LM Ericsson (publ), Stockholm (SE)

(72) Inventor: Henrik Rydén, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 365 days.

(21) Appl. No.: 18/016,166

(22) PCT Filed: Jul. 7, 2021

(86) PCT No.: PCT/SE2021/050693
§ 371 (c)(1),
(2) Date: Jan. 13, 2023

(87) PCT Pub. No.: WO2022/015221
PCT Pub. Date: Jan. 20, 2022

(65) Prior Publication Data

US 2023/0262448 A1 Aug. 17, 2023

Related U.S. Application Data

(60) Provisional application No. 63/051,579, filed on Jul. 14, 2020.

(51) Int. Cl.
*H04W 8/22* (2009.01)
*G06N 20/00* (2019.01)
(Continued)

(52) U.S. Cl.
CPC .............. *H04W 8/22* (2013.01); *G06N 20/00* (2019.01); *H04W 64/006* (2013.01); *H04W 36/08* (2013.01)

(58) Field of Classification Search
CPC .............................. H04W 8/22; H04W 64/006
(Continued)

(56) References Cited

U.S. PATENT DOCUMENTS

2009/0067367 A1 3/2009 Buracchini et al.
2009/0104880 A1 4/2009 Abe et al.
(Continued)

FOREIGN PATENT DOCUMENTS

EP 3343441 A1 7/2018
GB 2627358 A 8/2024
(Continued)

OTHER PUBLICATIONS

Partial Supplementary European Search Report for European Patent Application No. 21841391.2, mailed Jul. 5, 2024, 13 pages.
(Continued)

*Primary Examiner* — Jirapon Tulop
(74) *Attorney, Agent, or Firm* — Withrow & Terranova, PLLC

(57) ABSTRACT

Methods are provided for managing a wireless device that is operable to connect to a communication network comprising a Radio Access Network (RAN). One method, performed by a node of the communication network, comprises: selecting, on the basis at least of information about one or more of a behavior of the wireless device and a radio environment experienced by the wireless device, a machine-learning (ML) model from a plurality of candidate ML models to be downloaded to the wireless device, the candidate models providing outputs on the basis of which respective RAN operations performed by the wireless device are configured; and causing transmission of the selected ML model to the wireless device for execution by the wireless device.

18 Claims, 10 Drawing Sheets

(51) Int. Cl.
*H04W 36/08* (2009.01)
*H04W 64/00* (2009.01)

(58) Field of Classification Search
USPC .......................................................... 455/418
See application file for complete search history.

(56) References Cited

U.S. PATENT DOCUMENTS

| | | | |
|---|---|---|---|
| 2010/0113024 | A1 | 5/2010 | Wu |
| 2019/0311552 | A1 | 10/2019 | Zhang et al. |
| 2020/0272859 | A1 | 8/2020 | Iashyn et al. |
| 2021/0022051 | A1 | 1/2021 | Jia et al. |
| 2021/0182658 | A1 | 6/2021 | Wang et al. |
| 2022/0114491 | A1 | 4/2022 | Kelly et al. |
| 2022/0279341 | A1* | 9/2022 | Tomala .................. G06N 20/00 |
| 2022/0287083 | A1* | 9/2022 | Gomes Baltar ... H04W 74/0808 |
| 2022/0321424 | A1 | 10/2022 | Ickin et al. |
| 2022/0342713 | A1 | 10/2022 | Shen et al. |
| 2023/0259789 | A1 | 8/2023 | Wang et al. |
| 2023/0336340 | A1* | 10/2023 | Polleri ................ G06F 11/3466 |
| 2023/0362082 | A1* | 11/2023 | Svennebring ......... H04W 24/08 |
| 2024/0135175 | A1 | 4/2024 | Wang et al. |

FOREIGN PATENT DOCUMENTS

| | | | |
|---|---|---|---|
| WO | 2019172813 | A1 | 9/2019 |
| WO | 2019228504 | A1 | 12/2019 |
| WO | 2020080989 | A1 | 4/2020 |
| WO | 2020122669 | A1 | 6/2020 |
| WO | 2020139179 | A1 | 7/2020 |
| WO | 2020139181 | A1 | 7/2020 |
| WO | 2021107831 | A1 | 6/2021 |
| WO | 2022013090 | A1 | 1/2022 |
| WO | 2022013093 | A1 | 1/2022 |
| WO | 2022013095 | A1 | 1/2022 |
| WO | 2022013104 | A1 | 1/2022 |

OTHER PUBLICATIONS

Author Unknown, "Technical Specification Group Radio Access Network; Evolved Univeral Terrestrial Radio Access (E-UTRA) and Evolved Universal Terrestrial Radio Access Network (E-UTRAN); Overall description; Stage 2 (Release 16)," Technical Specification 36.300, Version 16.1.0, Mar. 2020, 3GPP Organizational Partners, 386 pages.

Author Unknown, "Technical Specification Group Radio Access Network; Evolved Universal Terrestrial Radio Access Network (E-UTRAN); X2 application protocol (X2AP) (Release 16)," Technical Specification 36.423, Version 16.1.0, Mar. 2020, 3GPP Organizational Partners, 438 pages.

Author Unknown, "Technical Specification Group Radio Access Network; NG-RAN; Xn application protocol (XnAP) (Release 16), " Technical Specification 38.423, Version 16.1.0, Mar. 2020, 3GPP Organizational Partners, 334 pages.

CMCC, "RP-19xxxx: New SID: Study on data collection further enhancement," 3GPP TSG RAN Meeting #86, Sitges, Spain, Dec. 9-12, 2019, 4 pages.

Intel Corporation, "RWS-210373: AI/ML enabled RAN and NR Air Interface," 3GPP TSG RAN Release 18 Workshop, Jun. 28-Jul. 2, 2021, 12 pages.

Oppo, et al., "S1-193039: Discussion on AI/ML Model Transfer in 5GS," 3GPP SA WG1 #88, Nov. 18-22, 2019, Reno, Nevada, 13 pages.

International Search Report and Written Opinion for International Patent Application No. PCT/EP2021/069149, mailed Oct. 21, 2021, 13 pages.

International Search Report and Written Opinion for International Patent Application No. PCT/EP2021/069181, mailed Oct. 26, 2021, 11 pages.

International Search Report and Written Opinion for International Patent Application No. PCT/EP2021/069163, mailed Oct. 26, 2021, 11 pages.

International Search Report and Written Opinion for International Patent Application No. PCT/EP2021/069157, mailed Oct. 21, 2021, 12 pages.

International Search Report and Written Opinion for International Patent Application No. PCT/SE2021/050693, mailed Sep. 23, 2021, 12 pages.

European Search Report for European Patent Application No. 21841391.2, mailed Sep. 26, 2024, 6 pages.

Examination Report for European Patent Application No. 21841391.2, mailed Oct. 9, 2024, 9 pages.

* cited by examiner

MANAGING A WIRELESS DEVICE THAT IS OPERABLE TO CONNECT TO A COMMUNICATION NETWORK

This application is a 35 U.S.C. § 371 national phase filing of International Application No. PCT/SE2021/050693, filed Jul. 7, 2021, which claims the benefit of provisional patent application Ser. No. 63/051,579, filed Jul. 14, 2020, the disclosures of which are incorporated herein by reference in their entireties.

TECHNICAL FIELD

The present disclosure relates to methods for managing a wireless device that is operable to connect to a communication network comprising a radio access network (RAN). The present disclosure also relates to a node for managing a wireless device that is operable to connect to a communication network, a RAN node, and to a computer program product configured, when run on a computer, to carry out methods for managing a wireless device.

BACKGROUND

Machine Learning (ML) is a branch of Artificial Intelligence (AI), and refers to the use of algorithms and statistical models to perform a task. ML generally involves a training phase, in which algorithms build a computational operation based on some sample input data, and an inference phase, in which the computational operation is used to make predictions or decisions without being explicitly programmed to perform the task. Support for ML in communication networks is an ongoing challenge. The 3rd Generation Partnership Project (3GPP) has proposed a study item on "Radio Access Network (RAN) intelligence (Artificial Intelligence/Machine Learning) applicability and associated use cases (e.g. energy efficiency, RAN optimization), which is enabled by Data Collection". It is proposed that the study item will investigate how different use cases impact the overall AI framework, including how data is stored across the different network nodes, model deployment, and model supervision.

One potential AI/ML implementation in networks is to signal an ML model to a UE, so that the model can be executed by the UE and decisions made locally. Transferring the execution of a model to a wireless device may reduce the amount of data to be transferred over the network, as model input data is frequently generated at the wireless device, as well as saving resources in the communication network node (for example a base station) that would otherwise execute the model. Without the need to transfer model input data, the model can, in general, be run more frequently at the wireless device than would be the case at a communication network node.

There is currently no framework within 3GPP for transmitting an ML model to a wireless device. The provision of such a framework involves several challenges, including practical challenges relating to how and when to transfer a model to a wireless device, and network performance challenges related to the use and implementation of ML models at a wireless device.

SUMMARY

Downloading ML models to a UE can enable the UE to perform and assist in radio network operations. However, each model might only be limited to a certain area, leading to UEs needing new models when they enter another radio area (e.g. connecting to a new base station). This can lead to large overheads, particularly for highly mobile UEs, or UEs moving in a certain pattern.

Another problem is that when a ML model is transmitted to UEs that only have a small amount of data to transmit or receive, there is a risk that the UE may not have any remaining traffic and hence the ML model will never be used.

It is an aim of the present disclosure to provide methods, a node, a RAN node, and a computer readable medium which at least partially address one or more of the challenges discussed above. It is a further aim of the present disclosure to provide methods, a RAN node, a wireless device and a computer readable medium which cooperate to facilitate the transfer of one or more ML models to a wireless device, so as to enable performance of a RAN operation configured on the basis of the ML model transferred to and executed by a wireless device.

According to a first aspect of the present disclosure, there is provided a method for managing a wireless device that is operable to connect to a communication network. The communication network comprises a Radio Access Network (RAN). The method, performed by a node of the communication network, comprises: selecting, on the basis at least of information about one or more of a behaviour of the wireless device and a radio environment experienced by the wireless device, a ML model from a plurality of candidate ML models to be downloaded to the wireless device, the candidate models providing outputs on the basis of which respective RAN operations performed by the wireless device are configured; and causing transmission of the selected ML model to the wireless device for execution by the wireless device.

Thus a method according to the first aspect provides a wireless device with a suitable ML model for performing or configuring a RAN operation, on the basis of a behaviour of the wireless device and/or a radio environment experienced by the wireless device.

According to a second aspect of the disclosure, there is provided a method for managing a wireless device that is operable to connect to a communication network. The communication network comprises a RAN. The method, performed by a RAN node of the communication network, comprises: receiving, from one or more further RAN nodes of the communication network, information relating to local ML models for use in cells served by the one or more further RAN nodes; and causing transmission, to the wireless device, of a ML model for execution by the wireless device. The ML model is configured for use in the one or more cells, based on the information received from the one or more further RAN nodes. The ML model provides an output on the basis of which a RAN operation performed by the wireless device is configured.

Further aspects of the disclosure refer to nodes and RAN nodes configured to perform methods of the disclosure, as well as computer program products comprising a computer readable medium having computer readable code embodied therein, the execution of which by a suitable computer or processor causes the computer or processor to perform methods of the disclosure.

For the purposes of the present disclosure, the term "ML model" encompasses within its scope the following concepts:

Machine Learning algorithms, comprising processes or instructions through which data may be used in a training process to generate a model artefact for performing a given task, or for representing a real world process or system;

the model artefact that is created by such a training process, and which comprises the computational architecture that performs the task; and the process performed by the model artefact in order to complete the task.

References to "ML model", "model", model parameters", "model information", etc., may thus be understood as relating to any one or more of the above concepts encompassed within the scope of "ML model".

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Embodiments of the disclosure will be described with respect to FIG. 1, which shows a communication network. The communication network comprises a radio access network (RAN) comprising a plurality of RAN nodes 101, 102, 103, 104, also called base stations, evolved NodeBs (eNBs), next generation Node Bs (gNBs), etc. Each RAN node serves one or more respective cells. A wireless device or user equipment (UE) 106 connects to the communication network through radio transmissions with one or more of the RAN nodes.

Figure 1:
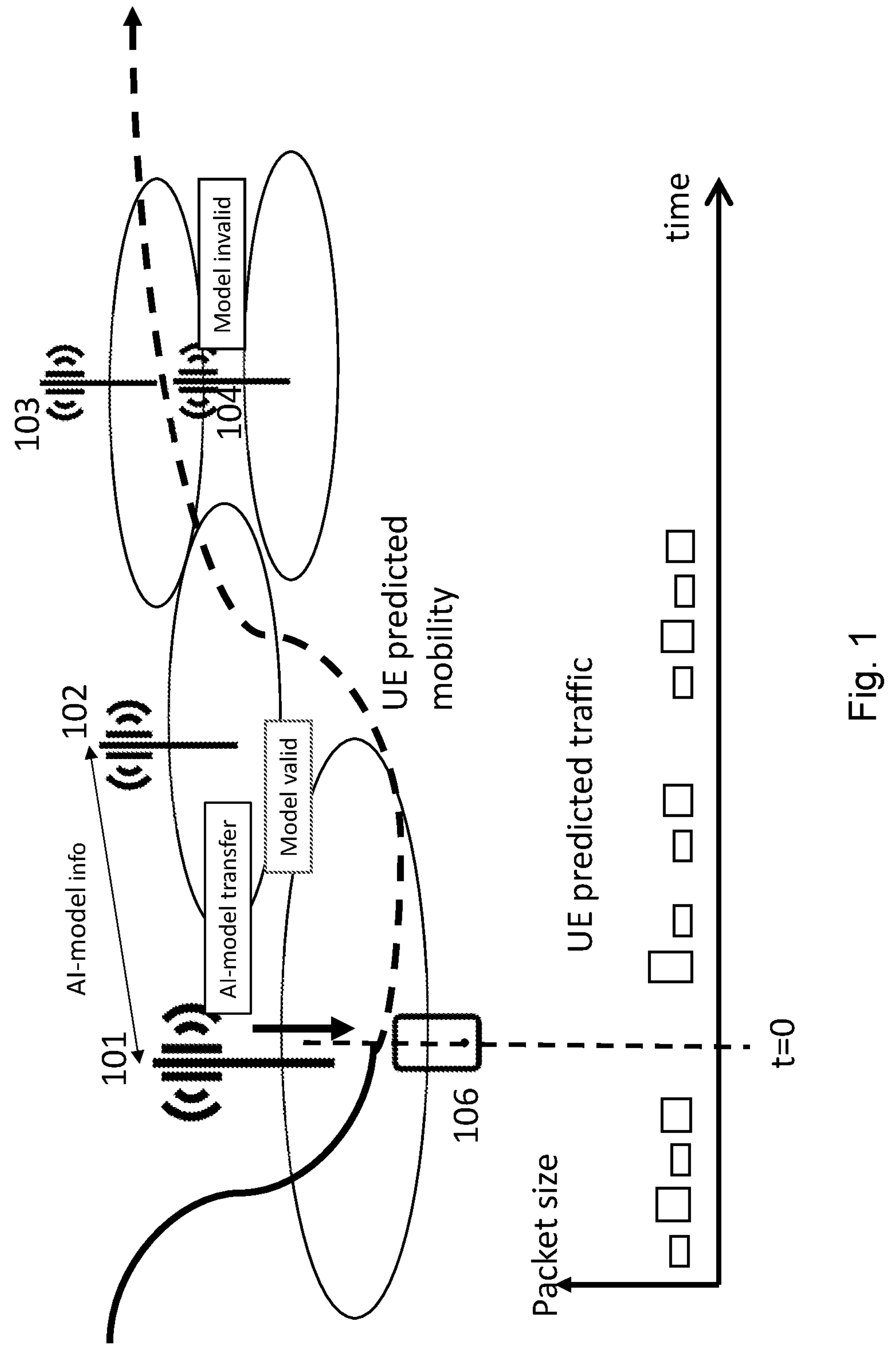
FIGS. 1 to 3 show a communication network according to embodiments of the disclosure.

FIG. 1 shows the position of the UE 106 at a time t=0. The solid line in FIG. 1 shows the past mobility of the UE 106, prior to time t=0. The dashed line shows predicted future mobility of the UE 106 after time t=0.

With use cases such as connected cars and drones, or UEs moving on public transport such as trains or the metro, the expected future location of a UE is more deterministic in comparison to for example pedestrian movement. As used herein, the term "location" may comprise the geolocation, the radio location (i.e., information relating to radio measurements performed by the UE, including one or more of: identities of serving and neighbouring cells detected by the UE; identities of beams detected by the UE; and measured reference signal received power (RSRP) or other radio metrics based on transmissions from those cells and/or beams) or both the geolocation and the radio location. The future location or mobility of a UE may be predicted, using for example one or more historical locations of a UE as input to a prediction model. Particularly where a single historical location of the UE is provided, the future location may additionally be determined using the velocity of the UE. The prediction model may comprise a machine-learning (ML) model, such as a neural network, or an algorithmic model (e.g., based on a most recent location and a velocity of the UE 106 at that time).

The future location of a UE could also be signaled by the UE to the network, such as the case where a drone (also referred to as an unmanned aerial vehicle or UAV) signals its flight path during connection setup. The flight path may comprise a sequence of location information elements with corresponding timestamps when the UE is expected to reach those locations. Other vehicles may signal their trajectories in a similar manner reporting. Based on the geo-location trajectory of the UE, the network can use deployment information to estimate the UE serving cell in a future time instance.

Returning to FIG. 1, it can be seen that the UE 106 is currently within the cell served by RAN node 101. It is then predicted to move through the cells served by RAN nodes 102, 103 sequentially.

FIG. 1 also shows the traffic pattern of transmissions between the UE 106 and the network. As used herein, the term "traffic pattern" refers to the variation over time of user data transmissions (e.g., user plane data) between the UE 106 and a RAN node, and may include one or more of: individual packet sizes; total packet sizes; times of packet transmission or arrival; time of last packet transmission or arrival. For example, certain applications or services utilized by the UE 106 may be associated with particular variations of user data transmissions, such as regular, periodic transmissions of user data, or periods of silence (i.e., an absence of user data transmission). Traffic patterns may be simple, as in these examples, or more complex.

Figure 4:
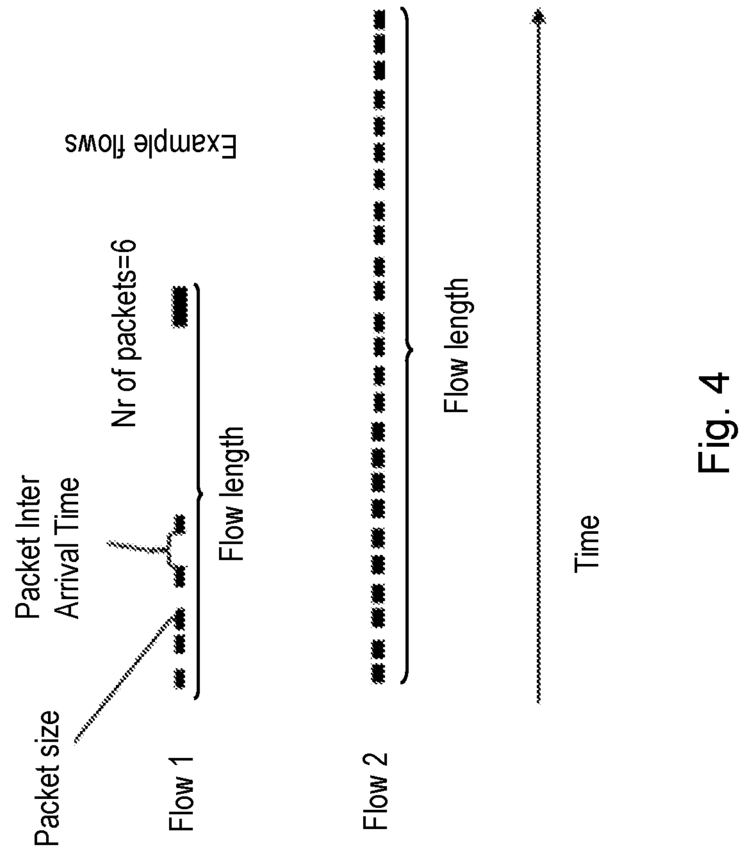
FIG. 4 shows a traffic pattern according to embodiments of the disclosure.

The prediction of future traffic patterns of a UE may be based on the history of data transmissions/receptions of the UE, or another UE, for example by using one or more of any of the following inputs:

- Packet Inter Arrival Time, e.g., the time between packet arrival
- Number of Packets Up/Down
- Total bytes Up/Down
- Packet sizes
- Time since last packet
- Statistical information for any of the preceding parameters, such as standard deviation, average, etc.
- Packet protocols (e.g., http, voice etc)
- UE manufacturer
- Packet arrival pattern from the same UE or other UE at the same time of the day
- Packet arrival pattern from the same UE or other UE at that location FIG. 4 is a schematic diagram showing two different traffic flows or traffic patterns. The first flow ("Flow 1") comprises a short flow with relatively few data packets and intermittent transmission of those data packets. The second flow ("Flow 2") comprises a relatively longer flow, with large numbers of packets transmitted in close proximity to each other in the time domain.

According to embodiments of the disclosure, the UE 106 is provided with a ML model to be executed by the UE. The ML model is operable to provide an output on the basis of which at least one RAN operation performed by the UE may be configured.

The RAN operation performed by the UE may be configured on the basis of an output of the ML model by the UE itself or by a node of the communication network, such as a RAN node. A RAN operation may comprise any operation that is at least partially performed by the UE in the context of its connection to the Radio Access Network. For example, a RAN operation may comprise a connection operation, a mobility operation, a reporting operation, a resource configuration operation, a synchronisation operation, a traffic management operation etc. Specific examples of RAN operations may include handover, secondary carrier prediction, geolocation, signal quality prediction, beam measurement and beamforming, traffic prediction, uplink synchronisation, channel state information compression, wireless signal reception/transmission, etc. Any one of more of these example operations or operation types may be configured on the basis of an output of an ML model. For example, the ML model may predict certain measurements, on the basis of which decisions for RAN operations may be taken. Such measurements may be used by the UE and/or provided to a RAN node. In further examples, the timing or triggering of a RAN operation may be based upon a prediction output by an ML model.

According to embodiments of the disclosure, a node of the network (such as a RAN node, a core network node, a server connected to the network, etc) determines whether or if to download one or more ML models to the UE 106 based at least on information about one or more of: a behaviour of the UE 106 and a radio environment experienced by the UE 106. For example, the node may select, on the basis of that information, a ML model from a plurality of candidate ML models to be downloaded to the UE. Each candidate model provides an output on the basis of which respective RAN operations performed by the UE are performed. The behaviour of the UE 106 may include, for example, the mobility of the UE (historical, current and/or predicted), or the radio traffic pattern of the UE 106 (historical, current and/or predicted), both as discussed above. The radio environment of the UE 106 may include the location of the UE 106, such as the radio location or the geolocation.

In some embodiments, the selected ML model is one which is based on information received from other RAN nodes serving cells which lie on a predicted path of the UE 106. For example, the RAN nodes may provide local ML models adapted for use within their respective cells (e.g., through being trained using training data obtained within those cells). In this case, the selected ML model may actually comprise one or more of the ML models adapted for use in those cells, such that the UE 106 can use the ML models once it camps on to the respective cell. Alternatively, the selected ML model may correspond to a combination of one or more local ML models, so that the ML model may be adapted for use in multiple cells. Those skilled in the art will appreciate that multiple techniques are available for combining models in this manner, including stacking, bootstrap aggregating, boosting, Bayesian model averaging, etc. The present disclosure is not limited in that regard. In alternative embodiments, the RAN nodes may provide training data which is specific to their respective cells, such that the selected model is one which is trained using the training data from cells lying on the predicted path of the UE 106.

Returning to FIG. 1, and the network makes a decision at time t=0 whether to download a ML model to the UE 106. Let it be assumed that the UE 106 is already configured with a ML model providing an output on the basis of which a RAN operation performed by the UE 106 is configured. However, the ML model is specific to the cell served by RAN node 101, on which the UE 106 is currently camped. The UE 106 is predicted to move to the cell served by RAN node 102, and thus RAN node 101 communicates with RAN node 102 to obtain AI model information (such as an ML model, or training data for an ML) which is specific to the cell served by RAN node 102. On the basis of this information, an ML model is selected which is specifically adapted for use in the cell served by RAN node 102, and RAN node 101 transmits the selected ML model to UE 106. In this way, the UE 106 can continue to benefit from valid ML models as it moves from RAN node 101 to RAN node 102. The selected ML model may be transmitted to the UE 106 prior to, or as part of a handover procedure between RAN nodes 101 and 102. Note that the selected ML model may not be valid in other cells; in the illustrated embodiment, the ML model is not valid in the cells served by either of RAN nodes 103 and 104.

Figure 2:
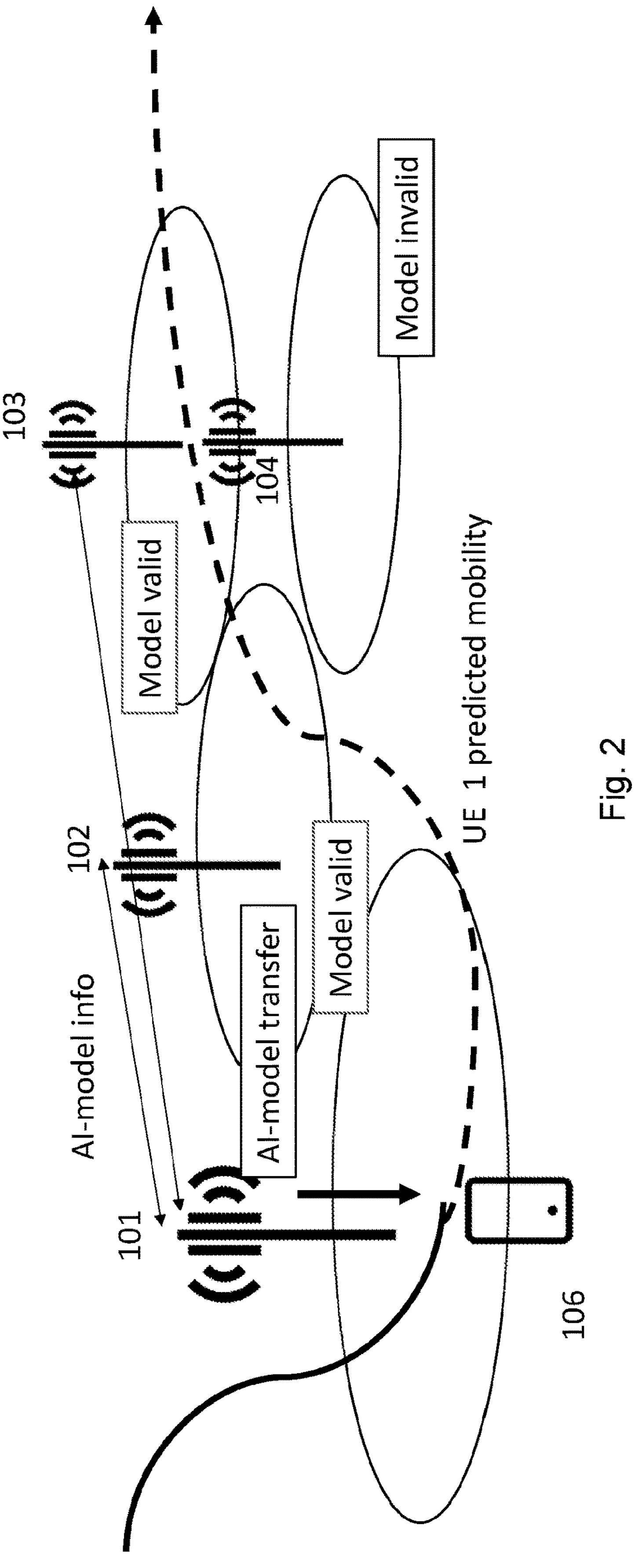

FIG. 2 shows a further example of this process. The UE 106 is again predicted to move from the cell served by RAN node 101, to cells served by RAN nodes 102 and 103 sequentially. In this example, RAN node 101 communicates with both RAN nodes 102 and 103 to obtain AI model information (such as an ML model, or training data for an ML) which is specific to the cells served by these RAN node 102, 103. On the basis of this information, an ML model is selected which is specifically adapted for use in the cells served by RAN nodes 102 and 103, and RAN node 101 transmits the selected ML model to UE 106. In this way, the UE 106 can continue to benefit from valid ML models as it moves from RAN node 101 to RAN node 103 via RAN 102. Note that in this instance the selected ML model may not be valid in the cell served by RAN node 104.

Thus in both FIGS. 1 and 2, the UE 106 is predicted to follow the same path. However, in FIG. 1 only the first cell on the predicted path of the UE 106 is used to obtain AI model information; in FIG. 2, the first two cells on the predicted path are used to obtain AI model information. According to embodiments of the disclosure, the number of RAN nodes from which AI model information is obtained may vary based further on the velocity of the UE 106. For example, the UE 106 shown in FIG. 2 may be moving at a greater speed than the UE shown in FIG. 1, such that it is more efficient to signal a ML model which is adapted for use in a greater number of cells.

Figure 3:
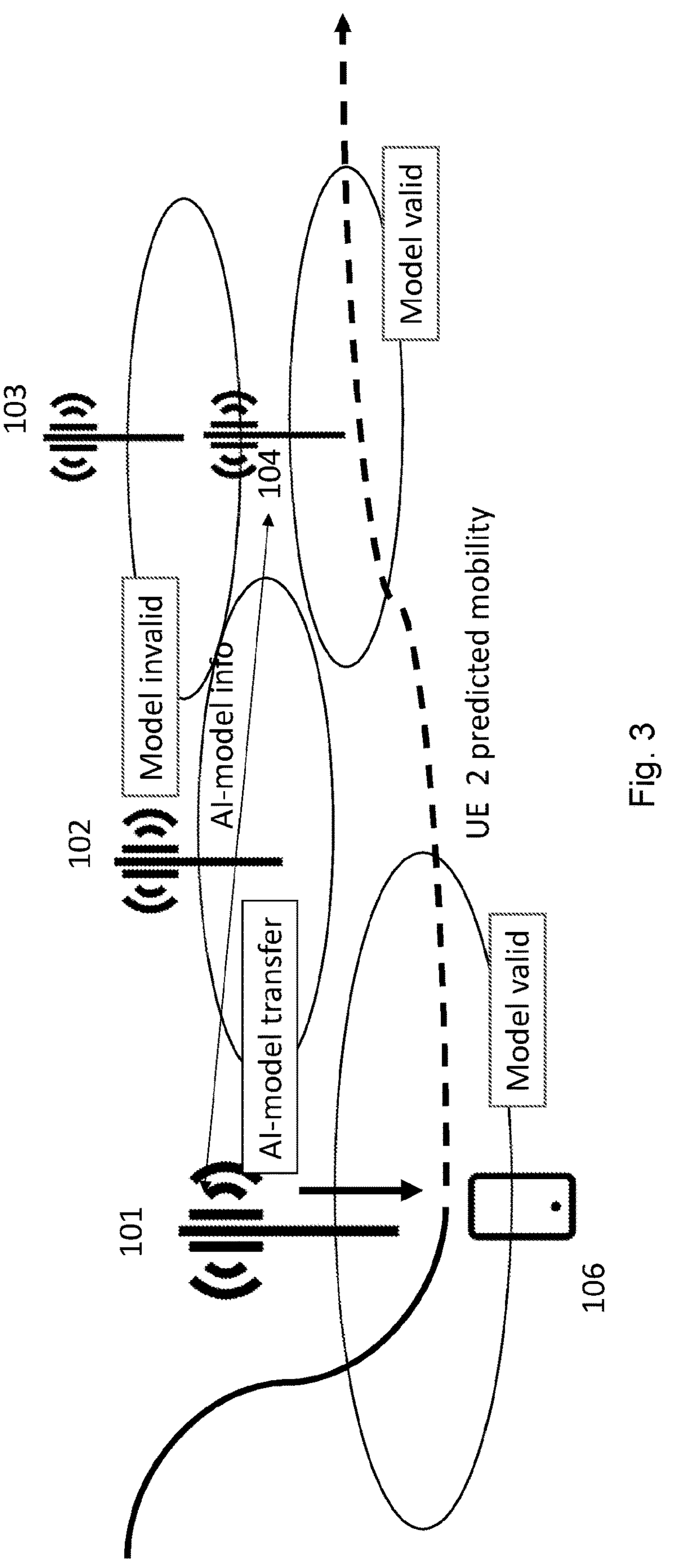

FIG. 3 shows a further example, in which the UE 106 is predicted to move from the cell served by RAN node 101, to the cell served by RAN node 104. Thus RAN node 101 communicates with RAN node 104 to obtain AI model information (such as an ML model, or training data for an ML) which is specific to the cell served by RAN node 104. On the basis of this information, an ML model is selected which is specifically adapted for use in the cells served by RAN node 104, and RAN node 101 transmits the selected ML model to UE 106. In this way, the UE 106 can continue to benefit from valid ML models as it moves from the cell served by RAN node 101 to that served by RAN node 104. Note that in this instance the selected ML model may not be valid in the cell served by RAN nodes 102, 103.

Embodiments of the disclosure also provide for the selection of an ML model based on information relating to the traffic pattern of the UE 106, such as the predicted traffic pattern.

The overhead associated with downloading an ML model to the UE 106 is considerable, and in some circumstances may not be justified. For example, if the predicted traffic pattern comprises relatively little traffic, the network may decide against downloading an ML model to the UE 106, as the overhead outweighs the potential benefits of providing the UE 106 with an updated ML model. On the other hand, if the predicted traffic pattern comprises a large amount of traffic, the network may decide to download an ML model to the UE 106 as the benefits exceed the overhead. For example, the amount of predicted traffic may be compared to one or more thresholds to determine whether or not to download an ML model to the UE 106. In further embodiments, the selection of an ML model may additionally or alternatively be based on a type of the UE. For example, constrained IoT devices are not likely to transmit or receive large amounts of data, and thus a decision may be taken not to download an ML model to such devices.

The decision on whether or not to download an ML model to the UE 106 may be taken by any suitable node in the network, such as the RAN node 101 (e.g., the serving RAN node of the UE 106), a core network node of the network, a server connected to the network, etc.

Figure 5:
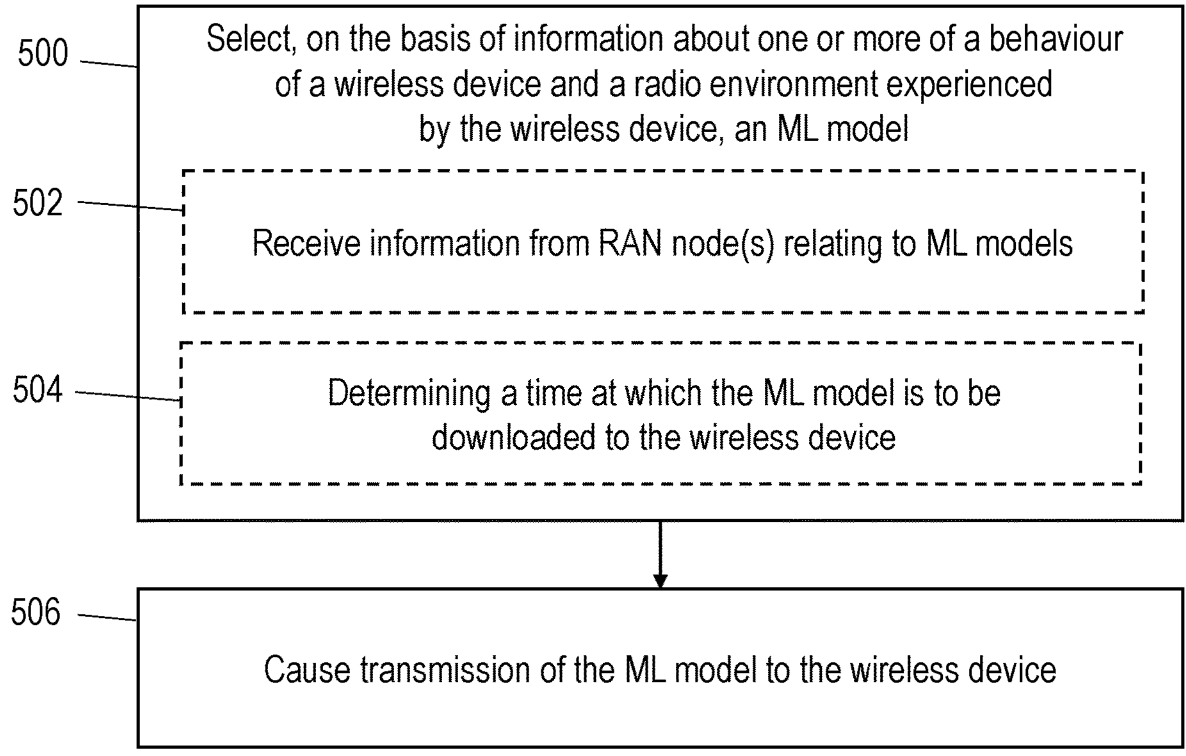
FIGS. 5 to 7 are flowcharts showing methods according to embodiments of the disclosure.

FIG. 5 is a flowchart of a method according to embodiments of the disclosure, for managing a wireless device that is operable to connect to a communication network, and particularly for providing a wireless device with a suitable ML model for performing or configuring a RAN operation. As noted above, the method is performed by any suitable node in the network, such as a RAN node (e.g., the serving RAN node of the wireless device), a core network node of the network, a server connected to the network, etc.

The method begins in step 500, in which the node selects an ML model for execution by a wireless device on the basis of information about one or more of a behaviour of the wireless device and a radio environment experienced by the wireless device. The ML model provides an output on the basis of which a RAN operation performed by the wireless device is configured. For example, the node may select the ML model from a plurality of candidate ML models, with each of the candidate ML models providing outputs on the basis of which respective RAN operations performed by the wireless device are configured. The selection in step 500 may correspond to one or more of: a selection between ML models for performing or configuring different RAN operations; a selection between ML models specifically adapted for use within certain cells (or certain combinations of cells); and a selection between downloading an ML model to the wireless device or not downloading an ML model to the device. It will further be noted that more than one ML model may be selected in step 500.

The RAN operation performed by the UE may be configured on the basis of an output of the ML model by the UE itself or by a node of the communication network, such as a RAN node. A RAN operation may comprise any operation that is at least partially performed by the UE in the context of its connection to the Radio Access Network. For example, a RAN operation may comprise a connection operation, a mobility operation, a reporting operation, a resource configuration operation, a synchronisation operation, a traffic management operation etc. Specific examples of RAN operations may include handover, secondary carrier prediction, geolocation, signal quality prediction, beam measurement and beamforming, traffic prediction, uplink synchronisation, channel state information compression, wireless signal reception/transmission, etc. Any one of more of these example operations or operation types may be configured on the basis of an output of an ML model. For example, the ML model may predict certain measurements, on the basis of which decisions for RAN operations may be taken. Such measurements may be used by the UE and/or provided to a RAN node. In further examples, the timing or triggering of a RAN operation may be based upon a prediction output by an ML model.

The behaviour of the wireless device may comprise the mobility of the wireless device, e.g., the location and/or velocity of the wireless device, and may comprise a predicted mobility of the device. The future location or mobility of the wireless device may be predicted, using for example one or more historical locations of the wireless device as input to a prediction model. Note that the historical locations of the wireless device may be signaled to the node by the wireless device, or stored in a mobility management node of the network (such as a mobility management entity or an access and mobility management function, for example) and thus accessible to the node. Particularly where a single historical location of the wireless device is provided, the future location may additionally be determined using the velocity of the wireless device. The prediction model may comprise a machine-learning (ML) model, such as a neural network, or an algorithmic model (e.g., based on a most recent location and a velocity of the wireless device at that time). The future location of a wireless device could also be signaled by the wireless device to the network, such as the case where a drone (also referred to as an unmanned aerial vehicle or UAV) or other autonomous vehicle signals its travel path during connection setup.

Step 500 may comprise a sub-step 502 of receiving information from one or more RAN nodes serving cells lying on the predicted path of the wireless device. Further information regarding this sub-step can be found below with respect to FIG. 7.

For example, the RAN nodes may provide local ML models adapted for use within their respective cells (e.g., through being trained using training data obtained within those cells). In this case, the selected ML model may actually comprise one or more of the ML models adapted for use in those cells, such that the wireless device can use the ML models once it camps on to the respective cell. Alternatively, the selected ML model may correspond to a combination of one or more local ML models, so that the ML model may be adapted for use in multiple cells. Those skilled in the art will appreciate that multiple techniques are available for combining models in this manner, including stacking, bootstrap aggregating, boosting, Bayesian model averaging, etc. The present disclosure is not limited in that regard. In alternative embodiments, the RAN nodes may provide training data which is specific to their respective cells, such that the ML model can be trained using the training data from cells lying on the predicted path of the wireless device and subsequently selected in step 500.

In this case, therefore, the ML model may be selected in step 500 so as to be specifically adapted for use in one or more cells lying on a predicted travel path of the wireless device.

The mobility of the wireless device, and particularly its velocity, may be used to select whether or not to download the ML model for secondary carrier prediction. For example, if the wireless device is highly mobile, it will have a greater chance of moving into an area that could be covered by another carrier. In this case, greater benefits are achieved by providing a model to predict secondary carriers. However, if the wireless device is moving extremely quickly, changing to a different carrier (e.g., with different transmission frequency) could be unnecessary, since it will go out-of-coverage quickly.

In another example, the node may additionally take into account the coverage on other carriers (i.e., potential secondary carriers for the wireless device) as well as the mobility of the wireless device. If the secondary carriers have poor coverage, then there is little to be gained in providing an ML model for predicting secondary carriers for the wireless device.

In a further example, the node may take into account the extent of overlaps between cells in the location (or predicted location) of the wireless device. If there is a large degree of overlap in a handover region between cells (e.g., carriers), it is beneficial to select an ML model that can improve the detection of coverage on another carrier. Conversely, if the wireless device is in a location (or predicted to be in a location) with a low degree of overlap between secondary carrier cells, the node may decide against selecting such an ML model for transmission to the wireless device.

The behavior of the wireless device may additionally or alternatively comprise a pattern of radio traffic between the wireless device and the network, and again this may be a predicted pattern of radio traffic. The prediction of future traffic patterns of a UE may be based on the history of data transmissions/receptions of the UE, or another UE, for example by using one or more of any of the following inputs:

Packet Inter Arrival Time, e.g., the time between packet arrival

Number of Packets Up/Down

Total bytes Up/Down

Packet sizes

Time since last packet

Statistical information for any of the preceding parameters, such as standard deviation, average, etc.

Packet protocols (e.g., http, voice etc)

UE manufacturer

Packet arrival pattern from the same UE or other UE at the same time of the day

Packet arrival pattern from the same UE or other UE at that location

One ML model relates to predicting a drop in signal quality. For example, such a model may enable the wireless device to prevent radio link failure by taking action before the signal quality drop occurs (e.g. inter-frequency handover). It can be critical to avoid radio link failure when service requirements are high, for example in applications requiring low-latency, or voice traffic.

The node may select such an ML model in step 500 if the UE is expected to have traffic when it reaches locations at which coverage holes are known to exist. For example, if the wireless device is predicted to be in a region where many coverage holes exist within a certain time window, and the wireless device is also expected to have a certain amount of traffic (e.g., above a threshold) or a certain type of traffic (e.g., critical data such as ultra-reliable low-latency communications or voice traffic), the node may select the ML model for predicting signal quality drops in step 500. In this case, therefore the selection is based on both the wireless device mobility and the traffic pattern.

Another example ML model provides for compression of channel state information (CSI).

An autoencoder is a type of machine learning algorithm that may be used to learn efficient data representations, that is, to concentrate data. Autoencoders are trained to take a set of input features and reduce the dimensionality of the input features, with minimal information loss. An autoencoder is divided into two parts, an encoding part or encoder and a decoding part or decoder. The encoder and decoder may comprise, for example, deep neural networks comprising layers of neurons. An encoder successfully encodes or compresses the data if the decoder is able to restore the original data stream with a tolerable loss of data.

According to embodiments of the disclosure, an ML model such as an autoencoder may be used to compress CSI. For example, the absolute values of the Channel impulse response (CIR) may be compressed to a code by the wireless device, and the code reported to a RAN node that performs beamforming based on the decoded code (reconstructed CIR). In this case, only the encoder part of the autoencoder needs to be transmitted to the wireless device.

CSI compression can enable better beamforming decisions. However, the mobility of the wireless device could affect the selection of a CSI compression ML model since a wireless device moving at high speed needs to provide more frequent updates of its channel state information so that beam selection does not become outdated. Thus a wireless device moving at high speed stands to gain more efficiency in compressing its CSI reports than a static wireless device. The traffic pattern could also be used to determine whether or not to select a CSI compression model ML model, as a wireless device which is not expected to transmit large amounts of data is unlikely to benefit sufficiently from compressing its CSI reports.

In some embodiments, the CSI report or its compressed equivalent may be used as an input to other ML models, such as the ML models to predict secondary carriers or signal quality drops discussed above. The compressed CSI may include one or more of: the channel impulse response; beam quality measurements such as RSRP, reference signal received quality (RSRQ) or signal to interference and noise ratio (SINR) from serving and/or neighboring cells on either the Synchronization Blocks (SSBs), or Channel State Information Reference Signals (CSI-RSs).

In further embodiments, an ML model such as that used for CSI compression discussed above may be used to compress the channel for improving the accuracy of observed time difference of arrival (OTDOA) used for positioning of the wireless device. By compressing the CSI, a greater amount of CSI information may be reported to the network without overhead penalty. This additional information improves the accuracy of measurements which rely on CSI reports, such as the OTDOA positioning protocol. In this case, the selection of an ML model may be based on one or more of: applications used by the wireless device; and a type of the wireless device. If the applications or device type are such that positioning requests are likely to be relatively frequent (e.g., a mapping application, or a vehicular wireless device), the node may select such a ML model to be downloaded to the wireless device in step 500. The node may further take into account whether a download of the ML model is quicker than simply responding to the positioning request.

Step 500 may further comprise the sub-step 504 of determining a time at which the ML model is to be downloaded to the wireless device.

The selection of the ML model may be carried out at connection setup of the wireless device, or upon the wireless device transitioning from idle to active mode. The selection may also be carried out responsive to a determination that the wireless device is moving, which could be detected by a change of signal quality measurements on reference signals such as CSI-RS or SSB in downlink, or SRS in the uplink. Alternatively, selection of the ML model may be performed after handover to a new cell.

In another embodiment, the timing of selection of the ML model may be based on radio metrics measured by the wireless device, such as one or more of RSRP, RSRQ, SINR, CQI measurements. For example, if the wireless device is in a bad coverage region, the node may wait until the wireless device is in a better signal quality region before selecting an ML model to be downloaded to the device (e.g., upon the radio metrics exceeding a threshold).

In a further embodiment, the timing of selection of the ML model may be based on cell load. If the network is highly loaded, downloading of a ML model may have a relatively lower priority. In this case, the ML model may be marked as a low-priority traffic, and only sent when there is no other data to be transmitted by the RAN node to connected devices.

In yet another embodiment, the decision whether to download a model may be carried out periodically, for example every second. The prediction performance of the wireless device trajectory and traffic improves when the network gets more data for the wireless device, for example its previous data packets or signal measurements.

In another embodiment, the radio environment experienced by the wireless device may include the number of other wireless devices in the vicinity of the wireless device. In this case, the decision whether to download a model could be triggered when a number of wireless devices can utilize the same ML model. In this case, the model can be sent in a broadcasted transmission, reducing the overhead in signaling.

In step 506, the node causes transmission of the selected ML model to the wireless device for execution by the wireless device. For example, where the node is a RAN node, step 506 may comprise the node transmitting the selected ML model to the wireless device itself. Alternatively, where the node is a core network node or a server, for example, step 506 may comprise the node transmitting an instruction to a serving RAN node for the wireless device to transmit the selected ML model. The instruction may comprise an indication of the selected ML model, and an identity of the wireless device.

Those skilled in the art will appreciate that there are many alternative methods for the transmission of an ML model to the wireless device, and the present disclosure is not limited to any particular method. Some example methods, in which the ML model is configured at the wireless device or UE, are discussed below.

In one embodiment, the model parameters may be sent to the wireless device. For example, an ML-model may be signalled using existing model formats such as Open Neural Network Exchange (ONNX), or formats used in commonly used toolboxes such as Keras or Pytorch.

For example, where the ML model comprises a neural network (such as a feed-forward neural network), the model may be signalled using a high-level model description, and detailed information regarding the weights of each layer of the neural network. The high-level model description (e.g., model parameter vector) may comprise parameters defining the structure and characteristics of the model, such as number of layers, activation function of respective layer, nature of connections between nodes of respective layer, weights, loss function, etc, of a neural network. The detailed information may include information on each layer, such as the value(s) for each parameter in the ML model.

In another embodiment, the ML model may be transmitted to the wireless device in a containerized image. The network node may for example use Docker containers to create, and signal to the wireless device an image capable of executing the ML model.

Docker containers typically contain all components which are needed for the ML model, including code, libraries, runtimes, and system tools. Containers therefore have the advantage of ensuring that there is no risk of the wireless device missing or having incompatible libraries (which may lead to errors). This stands in contrast to the methods described above, in which the model parameters are signalled to the wireless device. However, since the containers support more than only the model parameters itself, the over-the-air signalling size is larger.

In a further embodiment, the wireless device may be preconfigured with a set of ML models for a certain RAN operation, where the model parameters are specified in a standard such as New Radio (NR) or Long Term Evolution (LTE). The wireless device may thus, for each RAN operation, be equipped with a set of ML models having a general configuration, e.g., trained on an aggregated dataset from multiple deployment scenarios (real data or simulations). In this embodiment, the network node does not need to transmit the model parameters to the wireless device but may instead transmit an indication (such as an index) of which ML model or models, in the set of ML models for a certain RAN operation, the wireless device should use.

Figure 6:
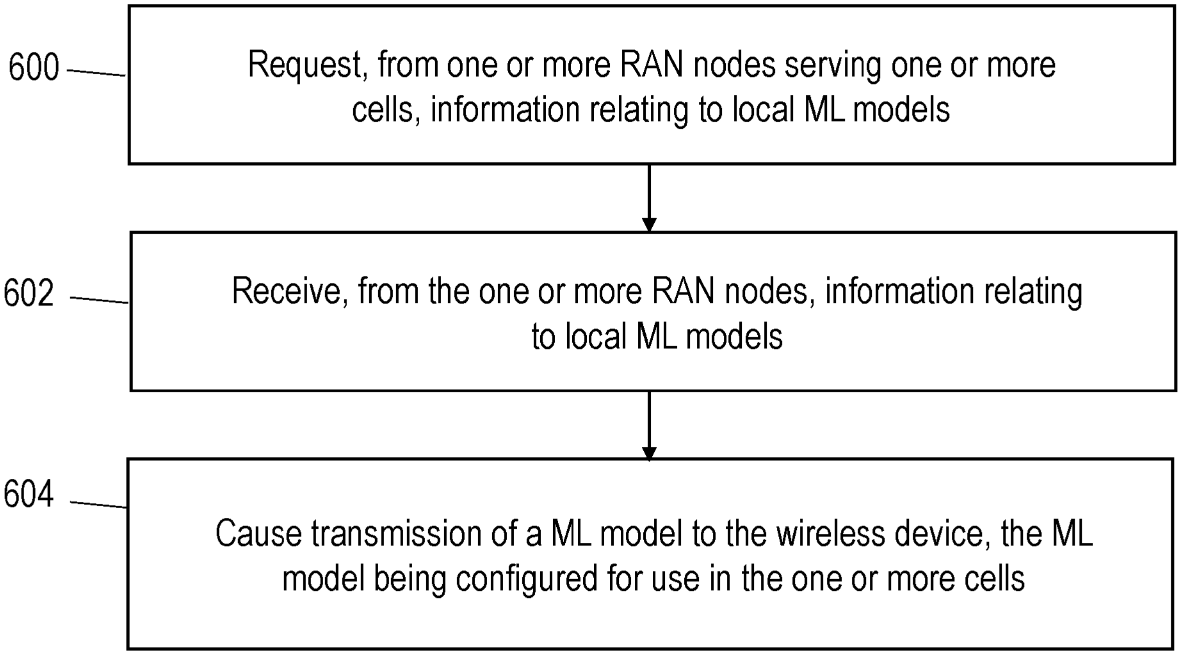

FIG. 6 is a flowchart of a further method according to embodiments of the disclosure, performed by a RAN node (such as RAN node 101 described above with respect to FIG. 1).

The method begins in step 600, in which the RAN node requests, from one or more RAN nodes serving one or more cells, information relating to ML models adapted for local execution in those cells. The request may indicate a particular RAN operation for which the ML models are intended to be used, or may alternatively indicate the ML model itself.

The information relating to ML models may comprise local ML models adapted for use within the respective cells (e.g., through being trained using training data obtained within those cells). In alternative embodiments, the information relating to ML models may comprise training data which is specific to the respective cells. Step 600 may comprise the RAN node transmitting a request message to the one or more RAN nodes, e.g., over an X2 or XN interface.

In one embodiment, the one or more RAN nodes for which a request is transmitted may serve cells which lie on or adjacent to a predicted travel path of a wireless device.

In step 602, the RAN node receives, from the one or more RAN nodes, the information related to local ML models as requested.

In step 604, the RAN node causes transmission of an ML model to the wireless device, e.g., through transmitting the ML model itself, or instructing another node to transmit the ML model to the wireless device. Further detail regarding the transmission of the ML model to the wireless device is given above with respect to step 506. The ML model is configured for use in the one or more cells served by the one or more RAN nodes for which information is received in step 602, based on the information received in step 602, and provides an output on the basis of which a RAN operation performed by the wireless device is configured. A detailed description of the various RAN operations is given above with respect to FIGS. 1 and 5.

For example, where the information received in step 602 comprises one or more local ML models themselves, the ML model transmitted in step 604 may actually comprise one or more of the local ML models adapted for use in those cells, such that the wireless device can use the ML models once it camps on to the respective cell. Alternatively, the transmitted ML model may correspond to a combination of one or more local ML models, so that the ML model may be adapted for use in multiple cells. Those skilled in the art will appreciate that multiple techniques are available for combining models in this manner, including stacking, bootstrap aggregating, boosting, Bayesian model averaging, etc. The present disclosure is not limited in that regard.

In a further example, where the information comprises training data for the one or more cells, the ML model may be trained using the training data and subsequently transmitted to the wireless device in step 604.

Figure 7:
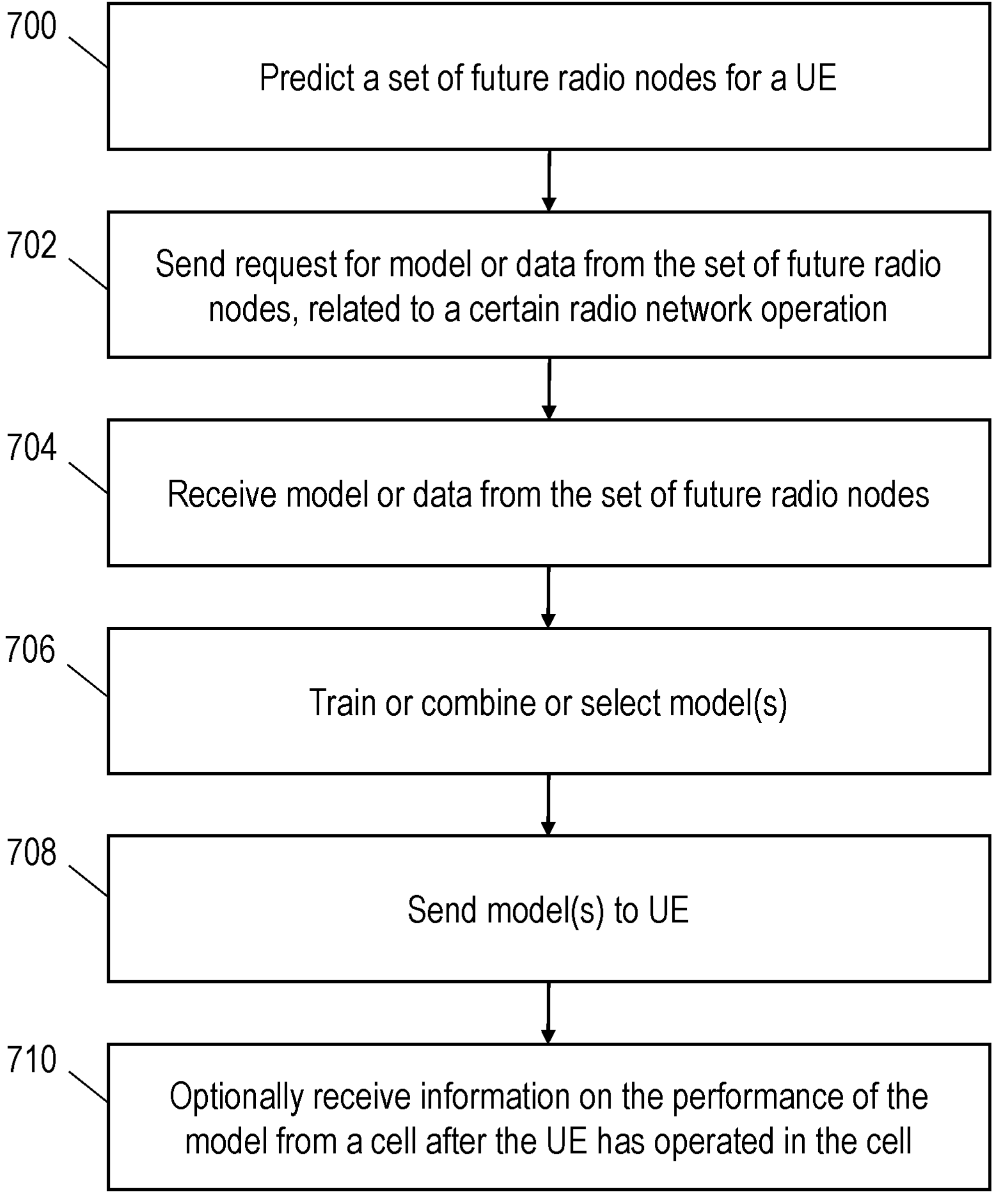

FIG. 7 is a flowchart of a further method according to embodiments of the disclosure, which combines the methods of FIGS. 5 and 6 described above. The method may be performed by a RAN node.

In step 700, the RAN node predicts a set of future RAN nodes for a UE. Thus, the RAN obtains determines the predicted travel path for the UE using any of the methods described above, and then determines the RAN nodes serving cells located along that travel path.

The predicted set of future nodes may be determined based on a combination of traffic and mobility. For example, the set of future nodes may be determined based on the probability p of the UE being served by a cell x in a time window T and, within that time window, the UE being expected to have data D. The RAN node may compare the quantity p*D to one or more thresholds, and then include cell x in the set of future network nodes based on the comparison (e.g., if p*D is greater than the threshold).

Alternatively, the set of future RAN nodes may be determined by a weighted average, the $$w_a = \sum_{t=0}^{T} d_t p_t,$$

where $d_t$ is the expected data in time-window t, and $p_t$ is the probability of being served by a certain RAN node at time-window t. The RAN node may be included in the set if $w_a$ is above a certain threshold.

In either case, the threshold can be based on service requirements of the UE. For example, a service that requires no radio link failure may be associated with a lower threshold in comparison to traffic with greater possibility to buffer traffic (such as video traffic), particularly in the case of ML models for the signal quality prediction.

In step 702, the RAN node sends one or more requests to the set of future RAN nodes, for ML models or training data relating to a certain radio network operation involving the UE. Various different RAN operations are described above.

In step 704, in response to the requests transmitted in step 702, the RAN node receives ML models and/or training data which are specific to the cells served by the set of future RAN nodes.

In step 706, in one embodiment, the RAN node trains one or more ML models using the training data received in step 704. For example, a future RAN node may can send its training data related to a certain use case (e.g., a certain RAN operation) for its own cell, which is combined with the training data available to the RAN node for its own cell.

For example, for secondary carrier predication ML models, a future RAN node may send the measurement samples of the primary and secondary carrier, which are then used to build a prediction function from primary to secondary carrier. These received samples are then combined with measurement samples taken by the RAN node, and an ML model is built (i.e., trained) that is valid for both cells. In a related embodiment, the ML model may be valid in a secondary cell, but could be enhanced by receiving data samples from cell 2.

In another embodiment, the RAN node in step 706 combines one or more ML models with the ML models received from the one or more future cells of the UE, e.g., through federated learning. This enables the node to build a combined model indicative of the UE movement. Those skilled in the art will be aware of multiple techniques for combining ML models, as set out above.

In step 708, the RAN node transmits the one or more models output from step 706 to the UE. Further detail regarding the transmission of the one or more models to the UE is given above with respect to step 506.

In step 710, optionally, the RAN node receives feedback as to the performance of the ML model(s), e.g., from the UE or from RAN nodes within the set of future RAN nodes. Such feedback may be utilized to improve decision making for future UEs. For example, the feedback may indicate whether models should be combined, or signaled without alteration, or not signaled, in a future instance for a second UE moving in a path similar to the first UE.

The methods described above may be applied to a large number of RAN operations. These are described in further detail below.

Examples of radio networking operations performed by the wireless device that could be executed in accordance with the configured model include Secondary carrier prediction for improved handovers
Privacy-conserving use of geo-location
Signal quality drop prediction
Beam Management
Latency reduction using traffic prediction.
Compression of channel state information (CSI)
Decoding of wireless signals
Encoding of wireless signals Regarding Beam Management, a wireless device may use an ML model to reduce its measurement requirements related to beamforming. In the RAN of a 5th Generation 3GPP network, referred to as NR, it is possible to request a wireless device such as a User Equipment (UE) to perform measurements on a set of Channel State Information Reference Signal (CSI-RS) beams. A stationary UE may experience a static environment and consequently minimal change in beam quality. The UE can therefore save battery by reducing beam measurements: using an ML model to predict beam strength instead of measuring it. A UE may for example measure a subset of beams and use an ML model to predict measurements for remaining beams.

Regarding latency reduction, in delay critical applications it is important not to lose Uplink synchronisation immediately before or during arrival of data, as synchronising the Uplink prior to Uplink transmission increases delay. One solution to this issue is to force a UE to perform synchronisation if no Uplink transmission has taken place within a certain time window. However, this can lead to a large increase of signalling and interference related to unnecessary Uplink synchronisation. A UE could instead predict data arrival using an ML model, and consequently ensure that Uplink synchronisation is completed before the predicted data arrival. The traffic experienced by one UE can be used to train a model that predicts when synchronisation, or in general when Uplink resources may be required. A UE could for example send a scheduling request if traffic is expected based on executed ML model, and so reduce its latency. In such examples, the RAN operation configured on the basis of an output of the ML model would be Uplink synchronisation, and its configuration would be the timing of the synchronisation, to coordinate with traffic predictions provided by the model.

Regarding channel state compression, it has been proposed to use Autoencoders to compress CSI for enhanced beamforming. An autoencoder is a type of machine learning algorithm that may be used to learn efficient data representations, that is to concentrate data. Autoencoders are trained to take a set of input features and reduce the dimensionality of the input features, with minimal information loss. An autoencoder is divided into two parts, an encoding part or encoder and a decoding part or decoder. The encoder and decoder may comprise, for example, deep neural networks comprising layers of neurons. An encoder successfully encodes or compresses the data if the decoder is able to restore the original data stream with a tolerable loss of data. One example of an autoencoder comprising an encoder/decoder for CSI compression is illustrated in FIG. 6. At the UE, the measured absolute values of the Channel Impulse Response (CIR) are input to the encoder part to be compressed to a code. This code is reported to a radio network node, which uses a corresponding decoder part of the autoencoder to reconstruct the measured CIR. The radio node may then perform beamforming based on the decoded code (CIR).

In a further proposal, the methods described above may be developed for compressing a channel in order to improve the Observed Time Difference of Arrival (OTDOA) positioning accuracy in a multipath environment. OTDOA is one of the positioning methods introduced for LTE networks in 3GPP specification Release 9. The richer channel information provided by OTDOA can enable the network to test multiple hypotheses for position estimation at the network side, which increases the potential for a more accurate position estimation. For channel compression, the encoder part of the autoencoder, once trained at the network, is signalled for execution to the UE.

Regarding the decoding or encoding of wireless signals, in future generations of wireless networks, it is anticipated that an ML model may be used to encode/decode wireless signals directly. This is in contrast to existing systems, such as $5^{th}$ generation NR, in which steps in the receiver chain including source decoder, channel decoder and de-modulator (analog to digital) are specified. The existing building blocks for the receiver chain, or parts of the existing building blocks, could be replaced with an ML model. This replacement would allow joint optimisation, enabling sharing of information across different layers, and so achieving higher flexibility and reducing the handcrafted design of each block. The high-level overview of such procedure is illustrated in FIG. 7.

It will be appreciated that some wireless devices might support different ML models or types of ML models, and such support might limit the available model inputs. For example, some UEs might lack GNSS-support, and some UEs might only support a limited Neural Network, owing to memory limitations. Signalling by a UE of its capabilities to the network node may enable the node to select a suitable model based on the UE capability report. The capabilities signalled to the network node could include:

- UE manufacturer/model etc.
- Maximum consumed memory of model that can be supported.
- Floating point support, for example 8-bit/16-bit/32-bit float.
- UE computational capabilities, for example in terms of number of operations per second, type of processor (CPU, GPU), number of CPUs etc. This could be reported specifically for executing an ML model or more generally associated to the UE.
- Type of models supported, for example decision tree, decision forest, linear regression, feedforward neural network, recurrent neural network, convolutional neural network, etc.
- Maximum supported computational cost/load for executing a model. This could be expressed, for example, in terms of a number of operations and their type that the UE can perform for executing a model. The maximum supported computational cost/load can also be associated to a particular type of model. Therefore, for each model supported by the UE, the UE could report a maximum supported computational cost for executing a model. This may enable the network node to select the most appropriate model (type, dimension, etc.) for a specific UE based on the UE capabilities.

In some examples, the capabilities may include an indication about the number of different ML models with which the UE can be configured simultaneously. For example, the UE could indicate that it can be configured with at most three decision trees and two Neural Networks simultaneously, or with 4 Neural Networks simultaneously etc. This capability may be based on the UE's hardware and software limitations.

The model configured by a network node for execution by a wireless device may be an ML model trained to perform or support one or more radio networking operations. The ML model may be any suitable ML model, such as a neural network, a decision tree, a linear regression model, etc.

For example, the model may represent a functional mapping $f(\cdot)$ between a set of features x (located at the device), which provide the input argument to the function represented by the model, and an output y representing the transformation of the input features, i.e. $y=f(x)$ Both the input feature x and the output y may be multidimensional vectors.

The type of information returned by a model in each information element as output may depend on the specific networking operation that the model is associated with. For example, the model may provide one or more information elements associated to estimates of signal strength or signal quality, such as RSRP, RSRQ, SINR, SINR, spectral efficiency, for a given cell, carrier frequency, etc. The model may alternatively return information elements representing the probability of certain events, etc.

If a model returns more than one output element, it is helpful for the user device to know not only what type of information elements the model returns but also in which order the information elements are returned. Finally, for the user device to correctly interpret the output information elements provided by the model, the user device may require an indication associated to the format of each information element, such as INTEGER, FLOAT, DOUBLE, etc.

The following use case illustrates how example methods according to the present disclosure may be incorporated into Secondary Carrier Prediction.

In order to detect a node on another frequency using target carrier prediction, a UE is required to perform signalling of source carrier information. For example, a mobile UE may periodically transmit source carrier information in order to enable a macro node to handover the UE to another node operating at a higher frequency. Using target carrier prediction, the UE would not need to perform inter-frequency measurements, leading to energy savings at the UE. Frequent signalling of source carrier information that would enable predicting the secondary frequency can lead to an additional overhead and should thus be minimized. However, there is a risk that if frequent periodic signalling is not performed, an opportunity for inter-frequency handover to a less-loaded cell on another carrier may be missed. For example, if the reporting periodicity is too high, the UE may not report any source carrier measurement when inside the coverage region of a target carrier cell.

According to examples of the present disclosure, the UE could be configured with an ML model, and use source carrier information as input to the model, which then triggers an output indicating coverage on the frequency-2 node at location 2. This reduces the need for frequent source carrier information signalling, while enabling the UE to predict the coverage on frequency 2. A potential model for this simple example is considered below (the relation between a source and target carrier is typically more complex, but the model below is sufficient for the purposes of illustration). The relation between the source and target carrier nodes can be learnt by a decision tree, where the RSRP and the angle to the UE can be used as features. The angle could for example be estimated by using the PMI available at the UE. Target carrier node coverage can be defined when the RSRP>−100. A simple ML coverage predictor can be as follows:

$$F(x1, x2) = \begin{cases} 1, & \text{if } (x1 = 0 \text{ and } x2\epsilon[-90, -100]) \\ 0 & \end{cases}$$

Where x2 is the RSRP measurement on the source carrier node, and x1 is the PMI. PMI=0 and RSRP in range of −90 to −100 triggers a report in this example.

For example with reporting periodicity of 100 ms, the network node would receive carrier information for x2=[−60,−61,−62;−63;−64: . . . −90:−91: . . . −110]. Using examples of the present disclosure, the network node may configure a model for executing by the UE ensuring that the UE reports only when the PMI is 0, and the RSRP is in range of [−90,−100].

As discussed above, the methods described above in FIGS. 5 and 7 are performed by a node, while the method described above in FIG. 6 is performed by a RAN node. The present disclosure provides a node and a RAN node that are adapted to perform any or all of the steps of the above discussed methods.

Figure 8:
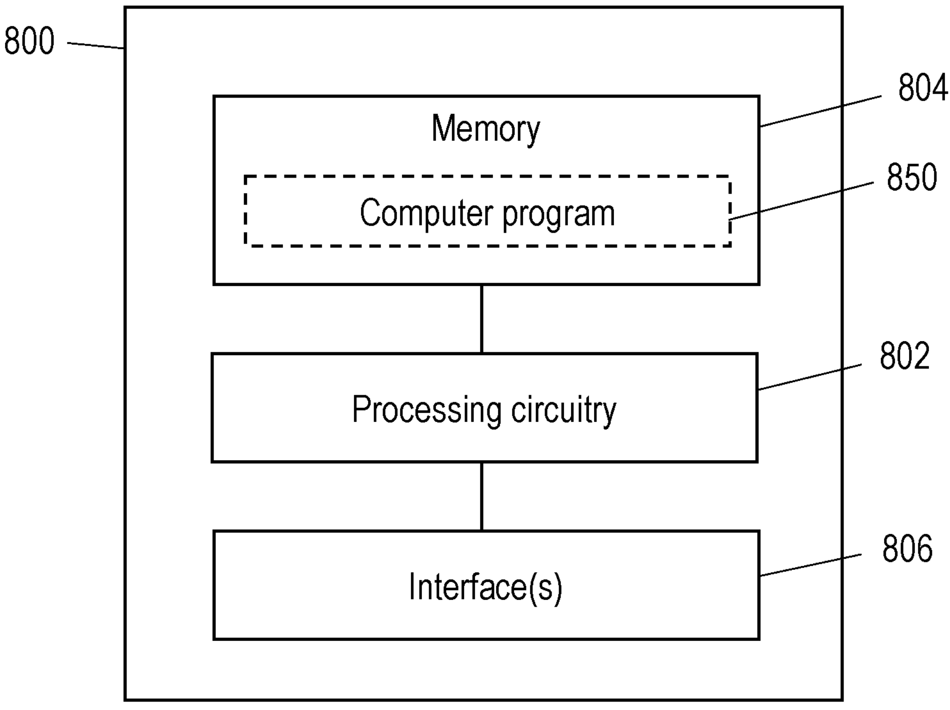
FIG. 8 is a schematic diagram of a node according to embodiments of the disclosure.

FIG. 8 is a block diagram illustrating an example node 800 which may implement a method according to examples of the present disclosure, such as those methods described above with respect to FIGS. 5 and/or 7, for example. The node 800 may comprise, or be implemented in, a RAN node or a node which is coupled to such a RAN node (such as a core network node, or a server in communication with the RAN node). The method may be implemented, for example, on receipt of suitable instructions from a computer program 850. Referring to FIG. 8, the node 800 comprises a processor or processing circuitry 802, and may comprise a memory 804 and interfaces 806. The processing circuitry 802 is operable to perform some or all of the steps of the methods described above with respect to FIGS. 5 and/or 7. The memory 804 may contain instructions executable by the processing circuitry 802 such that the node 800 is operable to perform some or all of the steps of the methods described above with respect to FIGS. 5 and/or 7. The instructions may also include instructions for executing one or more telecommunications and/or data communications protocols. The instructions may be stored in the form of the computer program 850. In some examples, the processor or processing circuitry 802 may include one or more microprocessors or microcontrollers, as well as other digital hardware, which may include digital signal processors (DSPs), special-purpose digital logic, etc. The processor or processing circuitry 802 may be implemented by any type of integrated circuit, such as an Application Specific Integrated Circuit (ASIC), Field Programmable Gate Array (FPGA) etc. The memory 804 may include one or several types of memory suitable for the processor, such as read-only memory (ROM), random-access memory, cache memory, flash memory devices, optical storage devices, solid state disk, hard disk drive etc. The interfaces 806 may be wired (e.g., providing for communication through electrical or optical transmission) or wireless (e.g., providing for communication through radio or microwave transmission).

Thus, in one embodiment, the processing circuitry 802 is caused to select, on the basis at least of information about one or more of a behaviour of a wireless device and a radio environment experienced by the wireless device, a ML model from a plurality of candidate ML models to be downloaded to the wireless device. The candidate models provide outputs on the basis of which respective RAN operations performed by the wireless device are configured. The processing circuitry 802 is further caused to cause transmission of the selected ML model to the wireless device for execution by the wireless device.

Figure 9:
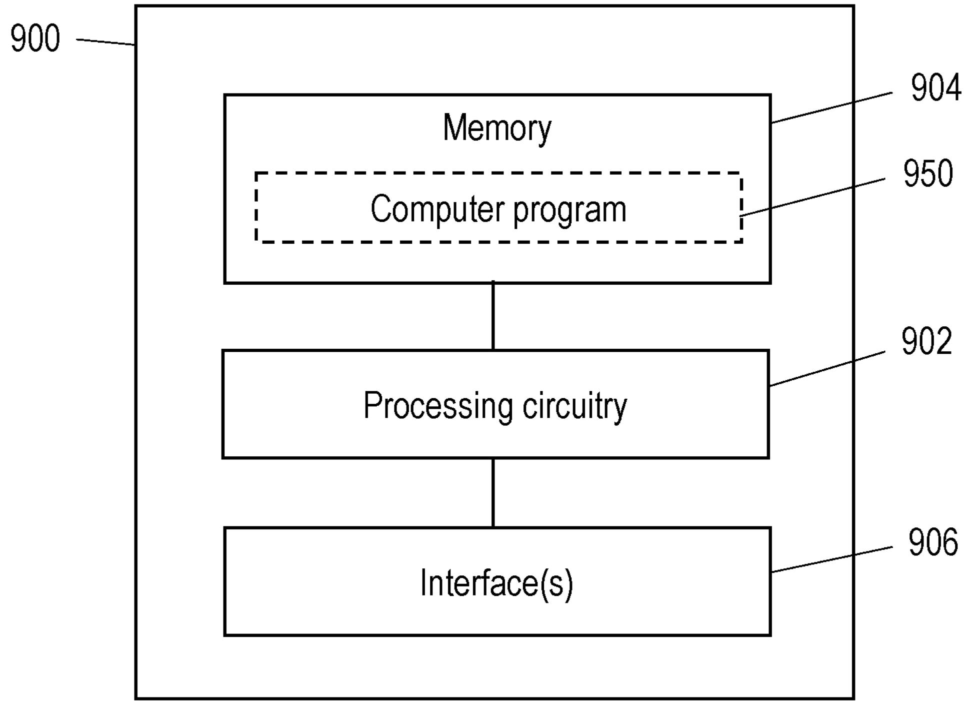
FIG. 9 is a schematic diagram of a RAN node according to embodiments of the disclosure.

FIG. 9 illustrates functional modules in another example of a node 900 which may execute examples of the methods described above with respect to FIGS. 5 and/or 7, for example according to computer readable instructions received from a computer program. It will be understood that the modules illustrated in FIG. 9 are functional modules, and may be realised in hardware, software, or any combination of hardware and software. The modules may comprise one or more processors and may be integrated to any degree.

Referring to FIG. 9, the node 900 is for managing a wireless device that is operable to connect to the communication network of which the node is a part. The node 900 comprises a selecting unit 902 for selecting, on the basis at least of information about one or more of a behaviour of a wireless device and a radio environment experienced by the wireless device, a ML model from a plurality of candidate ML models to be downloaded to the wireless device. The candidate models provide outputs on the basis of which respective RAN operations performed by the wireless device are configured. The node further comprises a causing unit 904, which is configured to cause transmission of the selected ML model to the wireless device for execution by the wireless device.

The node may further comprise one or more interfaces (not illustrated), which may be wireless or wired, for communicating with other nodes of the communication network or wireless devices.

Figure 10:
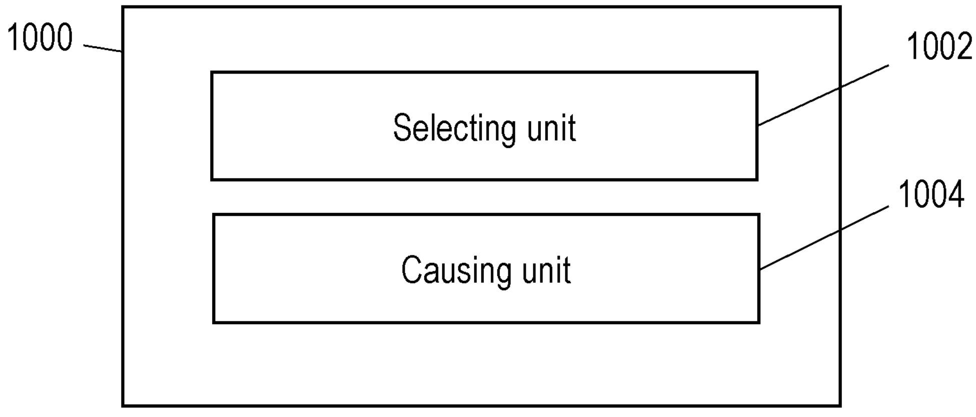
FIG. 10 is a schematic diagram of a node according to further embodiments of the disclosure.

FIG. 10 is a block diagram illustrating an example RAN node 1000 (e.g., a base station, eNodeB, gNodeB, etc) which may implement a method according to examples of the present disclosure, such as those methods described above with respect to FIG. 6, for example. The method may be implemented, for example, on receipt of suitable instructions from a computer program 1050. Referring to FIG. 10, the RAN node 1000 comprises a processor or processing circuitry 1002, and may comprise a memory 1004 and interfaces 1006. The processing circuitry 1002 is operable to perform some or all of the steps of the methods described above with respect to FIG. 6. The memory 1004 may contain instructions executable by the processing circuitry 1002 such that the node 1000 is operable to perform some or all of the steps of the method described above with respect to FIG. 6. The instructions may also include instructions for executing one or more telecommunications and/or data communications protocols. The instructions may be stored in the form of the computer program 1050. In some examples, the processor or processing circuitry 1002 may include one or more microprocessors or microcontrollers, as well as other digital hardware, which may include digital signal processors (DSPs), special-purpose digital logic, etc. The processor or processing circuitry 1002 may be implemented by any type of integrated circuit, such as an Application Specific Integrated Circuit (ASIC), Field Programmable Gate Array (FPGA) etc. The memory 1004 may include one or several types of memory suitable for the processor, such as read-only memory (ROM), random-access memory, cache memory, flash memory devices, optical storage devices, solid state disk, hard disk drive etc. The interfaces 1006 may be wired (e.g., providing for communication through electrical or optical transmission) or wireless (e.g., providing for communication through radio or microwave transmission).

Thus, in one embodiment, the processing circuitry 1002 is configured to cause the RAN node to receive, from one or more further RAN nodes of the communication network, information relating to local ML models for use in cells served by the one or more further RAN nodes; and to cause transmission, to the wireless device, of a ML model for execution by the wireless device. The ML model is configured for use in the one or more cells, based on the information received from the one or more further RAN nodes. The ML model provides an output on the basis of which a RAN operation performed by the wireless device is configured.

Figure 11:
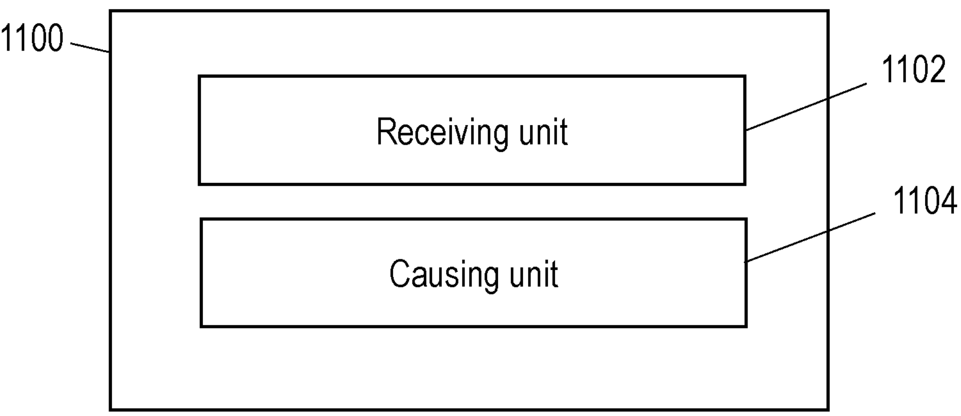
FIG. 11 is a schematic diagram of a RAN node according to further embodiments of the disclosure.

FIG. 11 illustrates functional modules in another example of a RAN node 1100 (e.g., a base station, eNodeB, gNodeB, etc) which may execute examples of the methods described above with respect to FIG. 6, for example according to computer readable instructions received from a computer program. It will be understood that the modules illustrated in FIG. 11 are functional modules, and may be realised in hardware, software, or any combination of hardware and software. The modules may comprise one or more processors and may be integrated to any degree.

Referring to FIG. 11, the RAN node 1100 is for managing a wireless device that is operable to connect to the communication network of which the node is a part. The node 1100 comprises a receiving unit 1102 for receiving, from one or more further RAN nodes of the communication network, information relating to local ML models for use in cells served by the one or more further RAN nodes; and to cause transmission, to the wireless device, of a ML model for execution by the wireless device. The RAN node 1100 further comprises a causing unit 1104, which is configured to cause transmission of a ML model to the wireless device for execution by the wireless device. The ML model is configured for use in the one or more cells, based on the information received from the one or more further RAN nodes. The ML model provides an output on the basis of which a RAN operation performed by the wireless device is configured.

The RAN node 1100 may further comprise one or more interfaces (not illustrated), which may be wireless or wired, for communicating with other nodes of the communication network or wireless devices.

The nodes 800, 900, 1000, 1100 may additionally comprise power circuitry (not illustrated). Power circuitry may comprise, or be coupled to, power management circuitry and is configured to supply the components of the node 800, 900, 1000, 1100 with power for performing the functionality described herein. Power circuitry may receive power from a power source. The power source and/or power circuitry may be configured to provide power to the various components of the node 800, 900, 1000, 1100 in a form suitable for the respective components (e.g., at a voltage and current level needed for each respective component). The power source may either be included in, or external to, the power circuitry and/or the node 800, 900, 1000, 1100. For example, the node 800, 900, 1000, 1100 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

The term "unit" may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Aspects of the present disclosure, as demonstrated by the above discussion, provide methods, a RAN node and a wireless device that together may implement a framework for reducing the cost in signalling ML models to a UE. Sending a model to a UE can improve several radio network operations and examples of the present disclosure offer solutions to several of the challenges encountered in implementing the transfer of ML models in a signalling framework. Such challenges include identifying how to describe the model, its inputs, outputs and validity, and what time-frequency resources to use when signalling. Examples of the present disclosure also offer solutions for the balancing of cost associated with sending a model (either owing to model size or frequency of sending) against benefit afforded by executing the model at a UE, and for adapting model complexity to UE capabilities.

Benefits afforded by different examples of the present disclosure may include efficient model signalling, for example by configuring a UE with ML models which are relevant or tailored to its trajectory and/or predicted future traffic. Additionally, signalling between RAN nodes enables user-specific ML models to be built, which can have reduced size and complexity than ML models required to be valid in a wider range of circumstances.

It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

For the avoidance of doubt, the following numbered statements set out embodiments of the disclosure:

Embodiment 1. A method for managing a wireless device that is operable to connect to a communication network, wherein the communication network comprises a Radio Access Network, RAN, the method, performed by a node of the communication network, comprising:

selecting, on the basis at least of information about one or more of a behaviour of the wireless device and a radio environment experienced by the wireless device, a ML model from a plurality of candidate ML models to be downloaded to the wireless device, the candidate models providing outputs on the basis of which respective RAN operations performed by the wireless device are configured; and causing transmission of the selected ML model to the wireless device for execution by the wireless device.

Embodiment 2. The method according to embodiment 1, wherein the behaviour of the wireless device comprises a mobility of the wireless device.

Embodiment 3. The method according to embodiment 2, wherein the mobility of the wireless device is a predicted mobility of the wireless device.

Embodiment 4. The method according to embodiment 3, wherein the selected ML model is adapted for use locally in one or more cells falling within the predicted mobility.

Embodiment 5. The method according to embodiment 4, further comprising receiving, from one or more RAN nodes serving the one or more cells falling within the predicted mobility, information relating to local ML models for use in the one or more cells.

Embodiment 6. The method according to embodiment 5, wherein the information relating to local ML models for use in the one or more cells comprises training data specific to the one or more cells, and wherein the selected ML model is trained using the training data.

Embodiment 7. The method according to embodiment 5, wherein the information relating to local ML models for use in the one or more cells comprises one or more local ML models for the one or more cells, and wherein the selected ML model transmitted to the wireless device is based on the one or more local ML models.

Embodiment 8. The method according to any one of embodiments 2 to 7, wherein the mobility of the wireless device comprises one or more of: a series of locations of the wireless device; and a velocity of the wireless device.

Embodiment 9. The method according to any one of the preceding embodiments, wherein the behaviour of the wireless device comprises a pattern of radio traffic between the wireless device and the communication network.

Embodiment 10. The method according to embodiment 9, wherein the pattern of radio traffic comprises a predicted pattern of radio traffic between the wireless device and the communication network.

Embodiment 11. The method according to any one of the preceding embodiments, wherein the ML model is selected based further on a device type of the wireless device.

Embodiment 12. The method according to any one of the preceding embodiments, further comprising determining a time at which the ML model is to be downloaded to the wireless device based at least on information about one or more of the behaviour of the wireless device and the radio environment experienced by the wireless device.

Embodiment 13. The method according to any one of the preceding embodiments, wherein the RAN operations comprise selecting a secondary carrier for transmissions between the wireless device and the communication network.

Embodiment 14. The method according to any one of the preceding embodiments, wherein the RAN operations comprise mitigating a predicted drop in radio signal quality or radio signal strength.

Embodiment 15. The method according to any one of the preceding embodiments, wherein the RAN operations comprise compressing reporting of channel state information.

Embodiment 16. The method according to any one of the preceding embodiments, wherein the radio environment experienced by the wireless device comprises one or more of: a measured signal strength or signal quality of transmissions between the wireless device and a serving RAN node; a measured signal strength or signal quality of transmissions by one or more non-serving RAN nodes; a number of detected non-serving RAN nodes; a level of interference experienced by the wireless device as a result of transmissions by one or more interfering nodes of the communication network.

Embodiment 17. The method according to any one of the preceding embodiments, wherein selecting a ML model comprises determining whether or not to transmit a ML model to the wireless device on the basis at least of information about one or more of a behaviour of the wireless device and a radio environment experienced by the wireless device.

Embodiment 18. A computer program product comprising a computer readable medium, the computer readable medium having computer readable code embodied therein, the computer readable code being configured such that, on execution by a suitable computer or processor, the computer or processor is caused to perform a method as claimed in any one of embodiments 1 to 17.

Embodiment 19. A node of a communication network comprising a RAN, wherein the node is for managing a wireless device that is operable to connect to the communication network, and wherein the node comprises processing circuitry configured to cause the node to:

select, on the basis at least of information about one or more of a behaviour of the wireless device and a radio environment experienced by the wireless device, a ML model from a plurality of candidate ML models to be downloaded to the wireless device, the candidate models providing outputs on the basis of which respective RAN operations performed by the wireless device are configured; and cause transmission of the selected ML model to the wireless device for execution by the wireless device.

Embodiment 20. The node according to embodiment 19, wherein the behaviour of the wireless device comprises a mobility of the wireless device.

Embodiment 21. The node according to embodiment 20, wherein the mobility of the wireless device is a predicted mobility of the wireless device.

Embodiment 22. The node according to embodiment 21, wherein the selected ML model is adapted for use locally in one or more cells falling within the predicted mobility.

Embodiment 23. The node according to embodiment 22, wherein the node is further caused to receive, from one or more RAN nodes serving the one or more cells falling within the predicted mobility, information relating to local ML models for use in the one or more cells.

Embodiment 24. The node according to embodiment 23, wherein the information relating to local ML models for use in the one or more cells comprises training data specific to the one or more cells, and wherein the selected ML model is trained using the training data.

Embodiment 25. The node according to embodiment 23, wherein the information relating to local ML models for use in the one or more cells comprises one or more local ML models for the one or more cells, and wherein the selected ML model transmitted to the wireless device is based on the one or more local ML models.

Embodiment 26. The node according to any one of embodiments 20 to 25, wherein the mobility of the wireless device comprises one or more of: a series of locations of the wireless device; and a velocity of the wireless device.

Embodiment 27. The node according to any one of embodiments 19 to 26, wherein the behaviour of the wireless device comprises a pattern of radio traffic between the wireless device and the communication network.

Embodiment 28. The node according to embodiment 27, wherein the pattern of radio traffic comprises a predicted pattern of radio traffic between the wireless device and the communication network.

Embodiment 29. The node according to any one of embodiments 19 to 28, wherein the ML model is selected based further on a device type of the wireless device.

Embodiment 30. The node according to any one of embodiments 19 to 29, wherein the node is further caused to determine a time at which the ML model is to be downloaded to the wireless device based at least on information about one or more of the behaviour of the wireless device and the radio environment experienced by the wireless device.

Embodiment 31. The node according to any one of embodiments 19 to 30, wherein the RAN operations comprise selecting a secondary carrier for transmissions between the wireless device and the communication network.

Embodiment 32. The node according to any one of embodiments 19 to 31, wherein the RAN operations comprise mitigating a predicted drop in radio signal quality or radio signal strength.

Embodiment 33. The node according to any one of embodiments 19 to 32, wherein the RAN operations comprise compressing reporting of channel state information.

Embodiment 34. The node according to any one of embodiments 19 to 33, wherein the radio environment experienced by the wireless device comprises one or more of: a measured signal strength or signal quality of transmissions between the wireless device and a serving RAN node; a measured signal strength or signal quality of transmissions by one or more non-serving RAN nodes; a number of detected non-serving RAN nodes; a level of interference experienced by the wireless device as a result of transmissions by one or more interfering nodes of the communication network.

Embodiment 35. The node according to any one of embodiments 19 to 34, wherein the node is further caused to select a ML model by determining whether or not to transmit a ML model to the wireless device on the basis at least of information about one or more of a behaviour of the wireless device and a radio environment experienced by the wireless device.

Embodiment 36. A method for managing a wireless device that is operable to connect to a communication network, wherein the communication network comprises a Radio Access Network, RAN, the method, performed by a RAN node of the communication network, comprising:

receiving, from one or more further RAN nodes of the communication network, information relating to local ML models for use in cells served by the one or more further RAN nodes; and causing transmission, to the wireless device, of a ML model for execution by the wireless device, wherein the ML model is configured for use in the one or more cells, based on the information received from the one or more further RAN nodes, and wherein the ML model provides an output on the basis of which a RAN operation performed by the wireless device is configured.

Embodiment 37. The method according to embodiment 36, wherein the information relating to local ML models for use in the one or more cells comprises training data specific to the one or more cells, and wherein the ML model transmitted to the wireless device is trained using the training data.

38. The method according to embodiment 36, wherein the information relating to local ML models for use in the one or more cells comprises one or more local ML models for the one or more cells, and wherein the ML model transmitted to the wireless device is based on the one or more local ML models.

Embodiment 39. The method according to embodiment 38, wherein the ML model transmitted to the wireless device comprises one or more of the one or more local ML models.

Embodiment 40. The method according to embodiment 38, wherein the ML model transmitted to the wireless device comprises a combination of the one or more local ML models.

Embodiment 41. The method according to any one of embodiments 36 to 40, further comprising requesting, from the one or more further RAN nodes of the communication network, information relating to local ML models for one or more RAN operations.

Embodiment 42. The method according to any one of embodiments 36 to 41, wherein the cells served by one or more further RAN nodes fall on a predicted mobility path of the wireless device.

Embodiment 43. A computer program product comprising a computer readable medium, the computer readable medium having computer readable code embodied therein, the computer readable code being configured such that, on execution by a suitable computer or processor, the computer or processor is caused to perform a method as claimed in any one of embodiments 36 to 42.

Embodiment 44. A RAN node of a communication network comprising a RAN, wherein the RAN node is for managing a wireless device that is operable to connect to the communication network, and wherein the node comprises processing circuitry configured to cause the RAN node to:

receive, from one or more further RAN nodes of the communication network, information relating to local ML models for use in cells served by the one or more further RAN nodes; and cause transmission, to the wireless device, of a ML model for execution by the wireless device, wherein the ML model is configured for use in the one or more cells, based on the information received from the one or more further RAN nodes, and wherein the ML model provides an output on the basis of which a RAN operation performed by the wireless device is configured.

Embodiment 45. The RAN node according to embodiment 44, wherein the information relating to local ML models for use in the one or more cells comprises training data specific to the one or more cells, and wherein the ML model transmitted to the wireless device is trained using the training data.

Embodiment 46. The RAN node according to embodiment 44, wherein the information relating to local ML models for use in the one or more cells comprises one or more local ML models for the one or more cells, and wherein the ML model transmitted to the wireless device is based on the one or more local ML models.

Embodiment 47. The RAN node according to embodiment 46, wherein the ML model transmitted to the wireless device comprises one or more of the one or more local ML models.

Embodiment 48. The RAN node according to embodiment 46, wherein the ML model transmitted to the wireless device comprises a combination of the one or more local ML models.

Embodiment 49. The RAN node according to any one of embodiments 44 to 48, wherein the RAN node is further caused to request, from the one or more further RAN nodes of the communication network, information relating to local ML models for one or more RAN operations.

Embodiment 50. The RAN node according to any one of embodiments 44 to 49, wherein the cells served by one or more further RAN nodes fall on a predicted mobility path of the wireless device.

The invention claimed is:

1. A method for managing a wireless device that is operable to connect to a communication network, wherein the communication network comprises a Radio Access Network, RAN, the method, performed by a node of the communication network, wherein the node of the communication network comprises a RAN node of the communication network, a core network node of the communication network, or a server connected to the communication network, the method comprising:

selecting, by the node of the communication network, on a basis at least of information about one or more of a behavior of the wireless device with respect to the communication network and a radio environment experienced by the wireless device in the communication network, a machine-learning, ML, model from a plurality of candidate ML models to be downloaded to the wireless device, the candidate models providing outputs on the basis of which respective RAN operations performed by the wireless device are configured; and causing, by the node of the communication network, transmission of the selected ML model to the wireless device for execution by the wireless device.

2. The method according to claim 1, wherein the behavior of the wireless device comprises a mobility of the wireless device.

3. The method according to claim 2, wherein the mobility of the wireless device is a predicted mobility of the wireless device.

4. The method according to claim 3, wherein the selected ML model is adapted for use locally in one or more cells falling within the predicted mobility.

5. The method according to claim 4, further comprising receiving, from one or more RAN nodes serving the one or more cells falling within the predicted mobility, information relating to local ML models for use in the one or more cells.

6. The method according to claim 5, wherein the information relating to local ML models for use in the one or more cells comprises training data specific to the one or more cells, and wherein the selected ML model is trained using the training data.

7. The method according to claim 5, wherein the information relating to local ML models for use in the one or more cells comprises one or more local ML models for the one or more cells, and wherein the selected ML model transmitted to the wireless device is based on the one or more local ML models.

8. The method according to claim 2, wherein the mobility of the wireless device comprises one or more of: a series of locations of the wireless device; and a velocity of the wireless device.

9. The method according to claim 1, wherein the behavior of the wireless device comprises a pattern of radio traffic between the wireless device and the communication network.

10. The method according to claim 9, wherein the pattern of radio traffic comprises a predicted pattern of radio traffic between the wireless device and the communication network.

11. The method according to claim 1, wherein the RAN operations comprise one or more of: selecting a secondary carrier for transmissions between the wireless device and the communication network; mitigating a predicted drop in radio signal quality or radio signal strength; and compressing reporting of channel state information.

12. The method according to claim 1, wherein the radio environment experienced by the wireless device comprises one or more of: a measured signal strength or signal quality of transmissions between the wireless device and a serving RAN node; a measured signal strength or signal quality of transmissions by one or more non-serving RAN nodes; a number of detected non-serving RAN nodes; a level of interference experienced by the wireless device as a result of transmissions by one or more interfering nodes of the communication network.

13. A node of a communication network comprising a Radio Access Network, RAN, wherein the node is for managing a wireless device that is operable to connect to the communication network, and wherein the node comprises processing circuitry configured to cause the node to: select, on the basis at least of information about one or more of a behavior of the wireless device and a radio environment experienced by the wireless device, a machine-learning, ML, model from a plurality of candidate ML models to be downloaded to the wireless device, the candidate models providing outputs on the basis of which respective RAN operations performed by the wireless device are configured; and cause transmission of the selected ML model to the wireless device for execution by the wireless device.

14. A method for managing a wireless device that is operable to connect to a communication network, wherein the communication network comprises a Radio Access Network, RAN, the method, performed by a RAN node of the communication network, comprising:

receiving, from one or more further RAN nodes of the communication network, information relating to local ML models for use in cells served by the one or more further RAN nodes; and causing transmission, to the wireless device, of a ML model for execution by the wireless device, wherein the ML model is configured for use in the one or more cells, based on the information received from the one or more further RAN nodes, and wherein the ML model provides an output on the basis of which a RAN operation performed by the wireless device is configured.

15. The method according to claim 14, wherein the information relating to local ML models for use in the one or more cells comprises training data specific to the one or more cells, and wherein the ML model transmitted to the wireless device is trained using the training data, or wherein the information relating to local ML models for use in the one or more cells comprises one or more local ML models for the one or more cells, and wherein the ML model transmitted to the wireless device is based on the one or more local ML models.

16. The method according to claim 14, further comprising requesting, from the one or more further RAN nodes of the communication network, information relating to local ML models for one or more RAN operations.

17. The method according to claim 14, wherein the cells served by one or more further RAN nodes fall on a predicted mobility path of the wireless device.

18. A Radio Access Network, RAN, node of a communication network comprising a RAN, wherein the RAN node is for managing a wireless device that is operable to connect to the communication network, and wherein the node comprises processing circuitry configured to cause the RAN node to:

receive, from one or more further RAN nodes of the communication network, information relating to local machine-learning, ML, models for use in cells served by the one or more further RAN nodes; and cause transmission, to the wireless device, of a ML model for execution by the wireless device, wherein the ML model is configured for use in the one or more cells, based on the information received from the one or more further RAN nodes, and wherein the ML model provides an output on the basis of which a RAN operation performed by the wireless device is configured.

* * * * *